United States Patent
Koch et al.

(10) Patent No.: US 7,848,718 B2
(45) Date of Patent: Dec. 7, 2010

(54) METHOD APPARATUS COMPRISING INTEGRATED CIRCUIT AND METHOD OF POWERING DOWN SUCH CIRCUIT

(75) Inventors: Stefan Koch, Zurich (CH); Hans Joachim Gelke, Zurich (CH)

(73) Assignee: ST-Ericsson SA, Plan-les-Ouates (CH)

( * ) Notice: Subject to any disclaimer, the term of this patent is extended or adjusted under 35 U.S.C. 154(b) by 726 days.

(21) Appl. No.: 11/578,899

(22) PCT Filed: Apr. 28, 2005

(86) PCT No.: PCT/IB2005/051391

§ 371 (c)(1),
(2), (4) Date: Oct. 11, 2007

(87) PCT Pub. No.: WO2005/106626

PCT Pub. Date: Nov. 10, 2005

(65) Prior Publication Data

US 2008/0045166 A1 Feb. 21, 2008

(30) Foreign Application Priority Data

May 5, 2004 (EP) .................................. 04101939

(51) Int. Cl.
*H04B 1/04* (2006.01)
(52) U.S. Cl. ..................... 455/127.5; 701/112; 701/115
(58) Field of Classification Search .............. 455/127.5; 701/112, 115; 713/322
See application file for complete search history.

(56) References Cited

U.S. PATENT DOCUMENTS

| 6,347,276 | B1 | 2/2002 | Avery, Jr. |
| 2002/0162037 | A1 | 10/2002 | Woods et al. |

FOREIGN PATENT DOCUMENTS

| JP | 06311012 | 11/1994 |
| JP | 2002 196846 | 11/2002 |

OTHER PUBLICATIONS

Philips Semiconductors, "8-bit universal shift/storage register (3-State)," 74F299 Product Data, Feb. 5, 2003, http://www.semiconductors.philips.com/acrobat_download/datasheets/74F299_3.pdf, downloaded Jul. 15, 2010, 12 pages.
Weste, N. et al., "Principles of CMOS VLSI Design: A Systems Perspective," 2nd Ed., pp. 490-495, Addison-Wesley, 2003, 9 pages.

*Primary Examiner*—David Q Nguyen
(74) *Attorney, Agent, or Firm*—Timothy L. Boller; Seed IP Law Group PLLC

(57) ABSTRACT

The present invention relates to a mobile apparatus comprising an integrated circuit to operate predefined functions, which integrated circuit is susceptible to be set in a standby operating mode wherein which said circuit can resume operation within a predefined delay. The circuit comprises configuration sequential logic having defined states that need to be stored before the circuit enters in standby mode. The mobile apparatus further comprises a power down unit for storing the states of the configuration sequential logic into a low leakage storage area during standby mode that reduces standby current considerably.

16 Claims, 4 Drawing Sheets

METHOD APPARATUS COMPRISING INTEGRATED CIRCUIT AND METHOD OF POWERING DOWN SUCH CIRCUIT

FIELD OF THE INVENTION

The present invention generally relates to low power integrated circuits (IC) for standby power reduction. In particular, it relates to a mobile apparatus comprising an IC being susceptible to be set in a standby-operating mode.

The invention also relates to a method of powering down such IC into standby mode and to a method of powering it up again.

The invention advantageously applies to mobile data processing systems.

BACKGROUND OF THE INVENTION

Low power dissipation in standby mode is a strong requirement for mobile electronic apparatuses as portable phones, personal digital assistants, portable computers, headsets, remote controls, watches, portable audio apparatus, wearable electronics, etc. With standby, the particular operating state is meant where the integrated circuit is powered, has little or no switching activity, but can resume activity at any time within a short period. In general, avoiding node activity reduces standby power in an IC. For circuits that are already optimized in this respect, the main contributor for standby power dissipation is leakage current.

The patent abstract of Japan JP 06311012 describes a circuit allowing limiting leakage current in standby mode by avoiding switching transistors.

SUMMARY OF THE INVENTION

An object of the present invention is to provide extra means for reducing the standby current by minimizing the leakage current. This is achieved by a mobile apparatus comprising an integrated circuit to operate predefined functions, the circuit being susceptible to be set in a standby operating mode wherein said circuit can resume operation anytime within a predefined period of time, said circuit comprising sequential logic having defined states, the mobile apparatus further comprising a power down unit for storing relevant states of the sequential logic into a state recovery storage area during standby mode.

Such a device according to the invention allows minimization of the powered logic, which causes a reduction of the leakage current.

The invention takes the following aspects into consideration. Micro controllers and signal processors, which constitute the heart of mobile electronic apparatuses, are large and become more and more complex due to the increasing level of integration. New functionalities like USB devices, BlueTooth extensions, multimedia functionality, camera and audio have been added to the processor core. Consequently, the amount of powered but seldom used logic has dramatically increased.

When in standby, processors need to maintain their current configuration and initialization in order to be able to resume activity very quickly. It is thus not acceptable to simply switch-off the power and lose the current state. The operating condition available before the standby mode needs to be re-established fast, reliably, and with little overhead.

According to the invention, all relevant circuit states are stored in a dedicated low leakage area of the circuit or the system thus allowing a reduction of the standby current considerably by minimizing the leakage current at a reasonable cost. After completed storage of the relevant registers, it is possible to power-off the complete circuit for standby mode. Part of the IC remains powered, but special design techniques allow keeping the leakage current small. After power-up, the configuration logic may be restored immediately with either a serial or a parallel architecture, as proposed in the two embodiments described below.

According to a preferred embodiment of the invention, the circuit comprises different logic blocks to distinguish between configuration sequential logic and functional sequential logic, so that only the states of the configuration sequential logic are considered relevant to be stored into said state recovery storage area.

Indeed, all the relevant static information that need to be restored after standby mode are to be found in configuration sequential logic that may consist, for example, of flip-flops. So not all states of all flip-flops are stored into the standby low-leakage area but only the states of the configuration sequential logic. A good discrimination between irrelevant and relevant registers allows keeping the powered part of the IC small.

The present invention advantageously allows the power-off of circuits having millions of transistors thus eliminating the leakage currents of powered devices. It also allows the reliable storage of relevant internal states before power-off, and almost immediate reload of the states after power-on.

BRIEF DESCRIPTION OF THE DRAWINGS

The present invention will now be described in more detail, by way of example, with reference to the accompanying drawings, wherein.

DETAILED DESCRIPTION OF THE INVENTION

A mobile apparatus is usually operated in any of the following three modes:

partial or full performance mode wherein the circuits deliver the intended functionality, that is, the circuits dissipate the highest amount of power and battery life is increased by reducing activity whenever less or no performance is needed, standby mode wherein which the circuit is not active but is still able to resume operation at any time within a short period of time depending on the application, the time period being usually in the range of 1 ns to 1 ms, the standby mode being the mode wherein which most devices are usually powered and initialized, power down mode wherein which the circuits are not active and require a relatively long period of time before a full performance level can be achieved, this period of time or delay being usually between 1 ms and several seconds, therefore devices are usually not powered in this state.

FIG. 1 to FIG. 6 describe at least two main embodiments of the invention to reduce the leakage current in standby with minimization of the powered logic. Each embodiment achieves a trade-off between logic area versus leakage current. This trade-off becomes all the more crucial as the use of deep sub-micron technologies increases, since logic area becomes smaller and smaller, even a large amount of logic does not account any more for significant area.

The trade-off between logic area versus leakage becomes very interesting because the leakage current of newer deep-sub-micron devices increases compared to older technologies. Low leakage low performance devices are needed, all the more as with decreasing feature size, the amount of embedded logic tends to increase which increases leakage power caused by conventional devices. Therefore, the trade-off between logic area versus leakage is very relevant for many battery powered systems.

Figure 1:
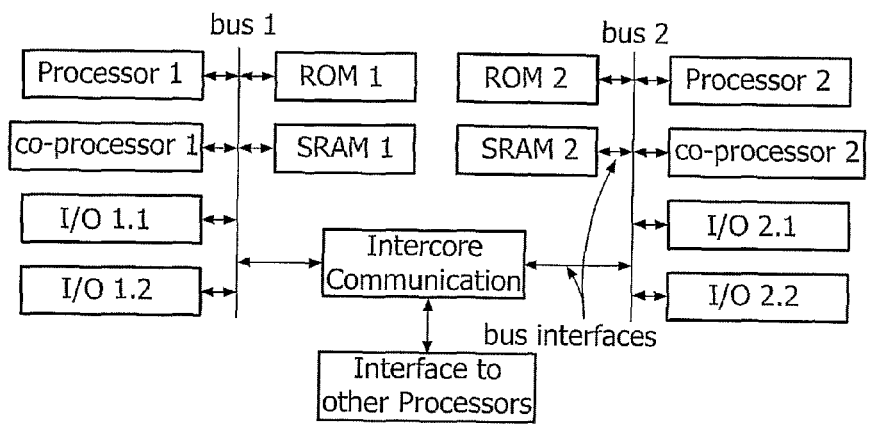
FIG. 1 is a block diagram representing a multiprocessor architecture.

FIG. 1 illustrates a multi-processor architecture that is well suited for all data processing applications, although the low power dissipation requirement is more specific for a mobile apparatus. This architecture describes a system that consists of zero or more processor cores which are embedded on a single semiconductor die. This architecture is very common in portable electronic apparatus where the processors constitute the main data processing entity. These processors, denoted Processor 1 and Processor 2, feature a list of peripheral functions, including ROMs (read-only memory), denoted ROM 1, ROM 2, SRAM (static random access memory), denoted SRAM 1 and SRAM 2, co-processors (internal computation accelerators for dedicated tasks), denoted co-processor 1 and co-processor 2, and I/O (input/output) peripheral blocks, denoted I/O 1.1, I/O 1.2, I/O 2.1 and I/O 2.2, to communicate with the external of the semiconductor die (for example USB, I$^2$C, I$^2$S, UART, SPI, keyboard, display, interrupt, camera, etc). The processors communicate with each other through the Intercore Communication block.

The multi-processor architecture of FIG. 1 loses its initialized state whenever the power is removed from the circuitry. But not all blocks are equally impacted by the loss of power as explained hereafter.

The processor cores are the central parts of the architecture. However they are not really configurable, or if they are, there are only a few possible configurations, which means that there is little or no information that can be lost during a power cut.

ROMs do not loose their content when power is removed. Therefore they do not constitute an issue for standby power. However, in the standby mode it is useful to cut-off the power to ROMs because they can account for considerable leakage current.

SRAMs loose their content when power is removed. Therefore important settings and configurations may not be stored into SRAM before power is turned-off.

Co-processors and I/O peripherals differ from the three categories above, as the amount of configuration data may be rather high. For instance, the configuration of a peripheral block like a USB is complex and strongly depends on the current operating mode. The settings and configuration data may be large and often need to be saved, should the power be removed from the circuits during standby.

Figure 2:
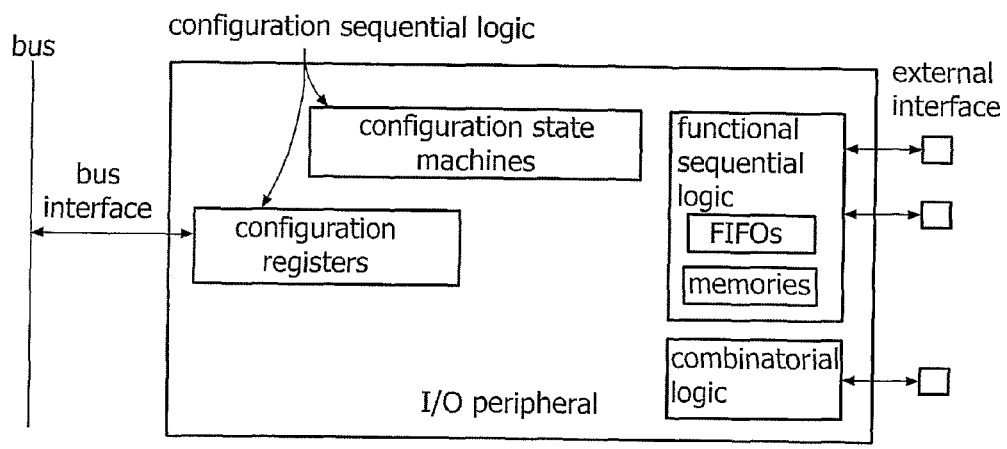
FIG. 2 is a block diagram showing in more details a block partitioning for low-power architecture, according to the invention.

FIG. 2 illustrates an internal structure of an I/O peripheral block according to the invention. It comprises configuration sequential logic CSL, functional sequential logic FSL and combinatorial logic CL.

Configuration sequential logic CSL consists of configuration state machines and state registers including flip-flops. It contains all the necessary information for the function of the peripheral block. It determines operation, settings and behavior of the block. After reset, this logic needs to have a well-defined state and thus needs to be designed with care.

Functional sequential logic FSL may also consist of flip-flops, but its state is not relevant when the I/O peripheral block is not used. This logic performs typical functions like synchronization, internal data RAM operations, state machines, FIFOs, shift registers, etc. But its content does not have to be saved before power down.

Combinatorial logic CL does not need to be powered when it is not used because it does not have any state to be saved. Its function solely depends on the above two categories.

All the relevant static information is stored in sequential logic, for example flip-flops. But not all the states of the sequential logic really need to be saved. Logic blocks are designed in FIG. 2 to discriminate between relevant configuration registers (settings) and functional registers. Functional registers do not need a particular initialization state that differ from the default state after reset. After completed storage of the configuration registers, it is possible to power-off the complete circuit for standby mode. Only part of the IC remains powered. Special design techniques that are well known to the ordinary-skilled person allow keeping the leakage current small, and good discrimination of relevant registers allows keeping the powered part of the IC small. After power-up, the configuration logic may be restored immediately with either a serial or a parallel architecture, as described with reference to FIG. 3 (first embodiment) and FIG. 4 to FIG. 5 (second embodiment), respectively.

FIG. 2 illustrates the partitioning in relevant state configuration and functional states. This block architecture is suited for standby power reduction if the state of the configuration sequential logic is stored before power cut. Most I/O peripheral feature only few hundreds of state configuration flip-flops, compared to all the other flip-flops, which are to be found in FIFOs and functional state machines, and whose states do not need to be saved. This I/O peripheral architecture allows differentiating between the various functions inside the IC, here being an I/O peripheral, which need to be identified prior to implementation of the block in order to facilitate the storage of the configuration into a low leakage area of the system, according to the invention.

Figure 3:
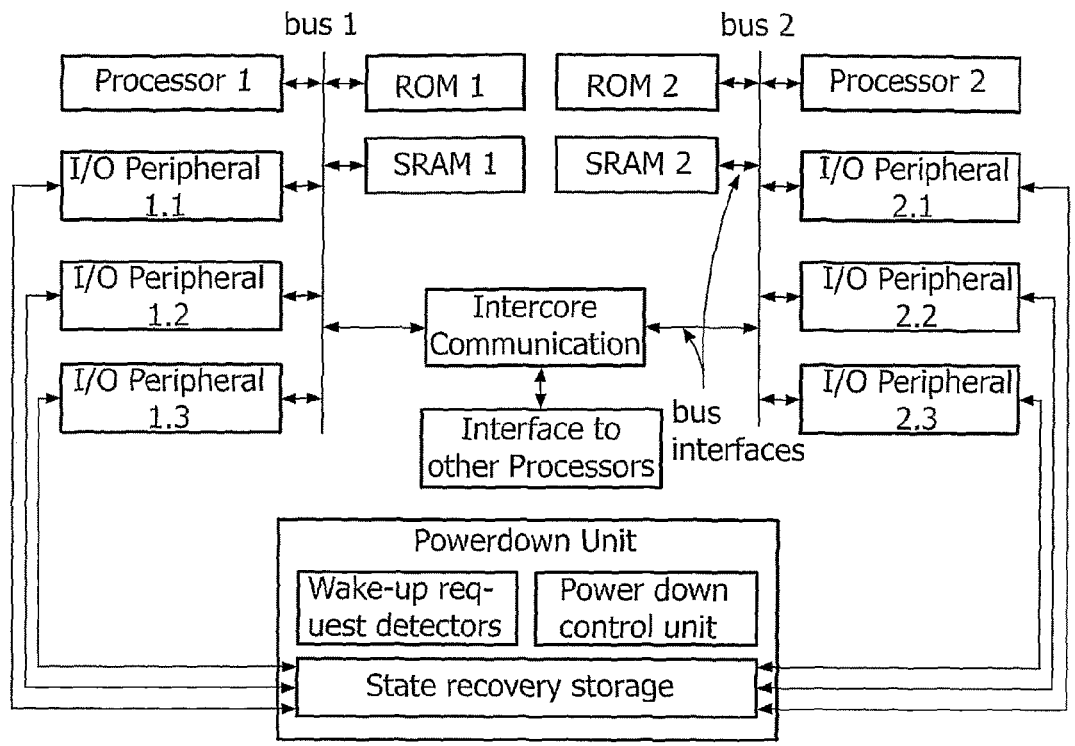
FIG. 3 is a block diagram representing a serial configuration reload architecture, according to a first embodiment of the invention.

FIG. 3 illustrates serial configuration reload architecture according to a first embodiment of the invention, based on the IC architecture described with reference to FIG. 2. This serial configuration reload architecture allows saving and reloading configurations. This architecture is implemented with serial scan of the relevant state registers or flip-flops contained in the configuration sequential logic described in FIG. 1. The serial scan is performed into a section of the IC that is powered during standby, and causes little leakage. Such a low-leakage area consists of state registers or flip-flops that are particularly designed for low leakage, low performance, low area, low driving strength. A person skilled in the art can design such state registers or flip-flops, as these requirements are not conflicting. The serial scan can be performed re-using the scan chains available for scan testing. Therefore the complexity of the architecture of the peripheral block does not increase. There is some overhead in the Design for Test (DfT) control logic; however, it does not contribute much to the total complexity.

The multi-processor architecture of FIG. 3 illustrates this first embodiment of the invention. Compared to the multi-processor architecture of FIG. 1, the new architecture is extended with one additional block: the Powerdown Unit. The power down unit comprises the following blocks:

a power down control unit PDCU to control the activity levels of the IC, wake-up request detectors WURD to detect activity coming from external processors, keyboards, timers, etc. on the boundary of the system that is in standby, which would require the system to wake-up, a state recovery storage area SRS to store the states of all configuration sequential logics that need to be saved before cut of the power supply.

The principle of this embodiment is that the data are shifted serially from the I/O peripheral blocks into the state recovery storage before entering standby mode. This architecture fulfils the latency requirements, which should be in the range of 1 ns to 1 ms. According to these requirements, the reload latency should not be longer than the maximum tolerance for operation resume. If the IC has, for example, about 10000 configuration flip-flops (which is already a big amount), and if these flip-flops are arranged, for example, in 50 scan chains, it would take no longer than 200 cycles to scan these flip-flops. Slow and low leakage flip-flops may have a speed of 10 MHz. Thus the total time for shift would then be no more than 20 μs, which is still much less than the reload latency requirement of 1 ms.

Figure 4:
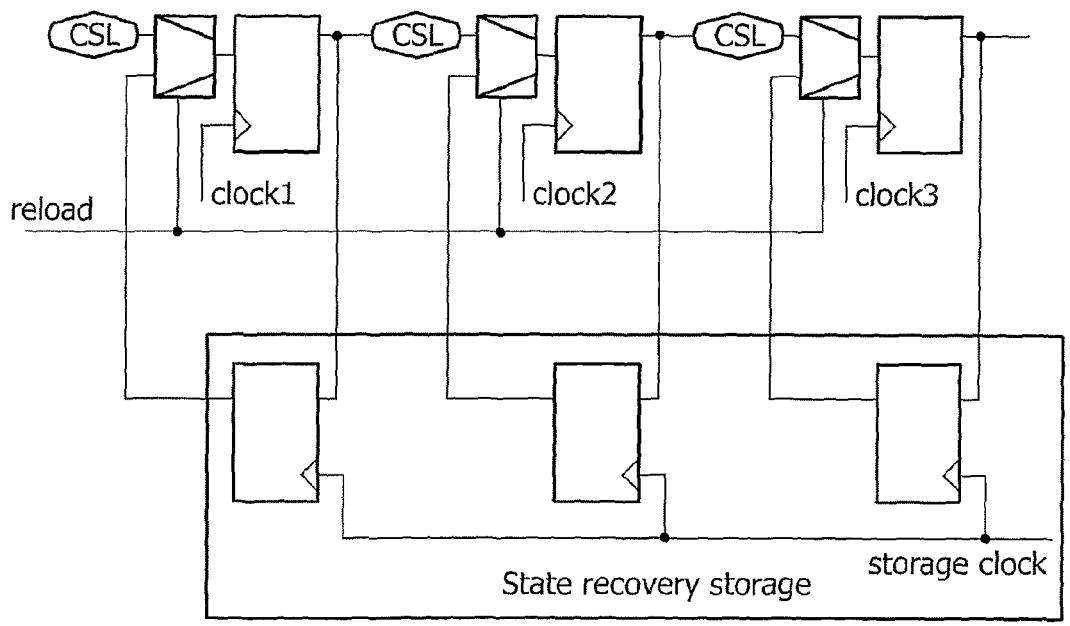
FIG. 4 is a block diagram representing an architecture for parallel store and reload according to a second embodiment of the invention.

FIG. 4 represents a detail of the second embodiment of the invention, which illustrates immediate configuration reload architecture. In this second embodiment, a very efficient architecture is proposed to save the configuration sequential logic CSL, represented in FIG. 4 in bubbles (denoted logic). The goal is to perform a parallel load into the state recovery storage. With this architecture, it takes only one cycle of digital data to perform the save and reload of the flip-flop values. This architecture requires twice as many connections. One line is used for saving and the other for reloading the flip-flops values. This architecture notably allows trading-off logic area with save and reload speed. Implementation details of this third embodiment are shown in FIG. 4. The digital configuration sequential logic is clocked with different clock signals, denoted clock1, clock2 and clock3 that are separated by logic functions. The output of each flip-flop is connected to the logic going downwards the next functional stage as well as to one state recovery flip-flop. A multiplexer in front of each flip-flop allows to direct the data flow from functional behavior or to reload the values stored in the state recovery storage.

Figure 5:
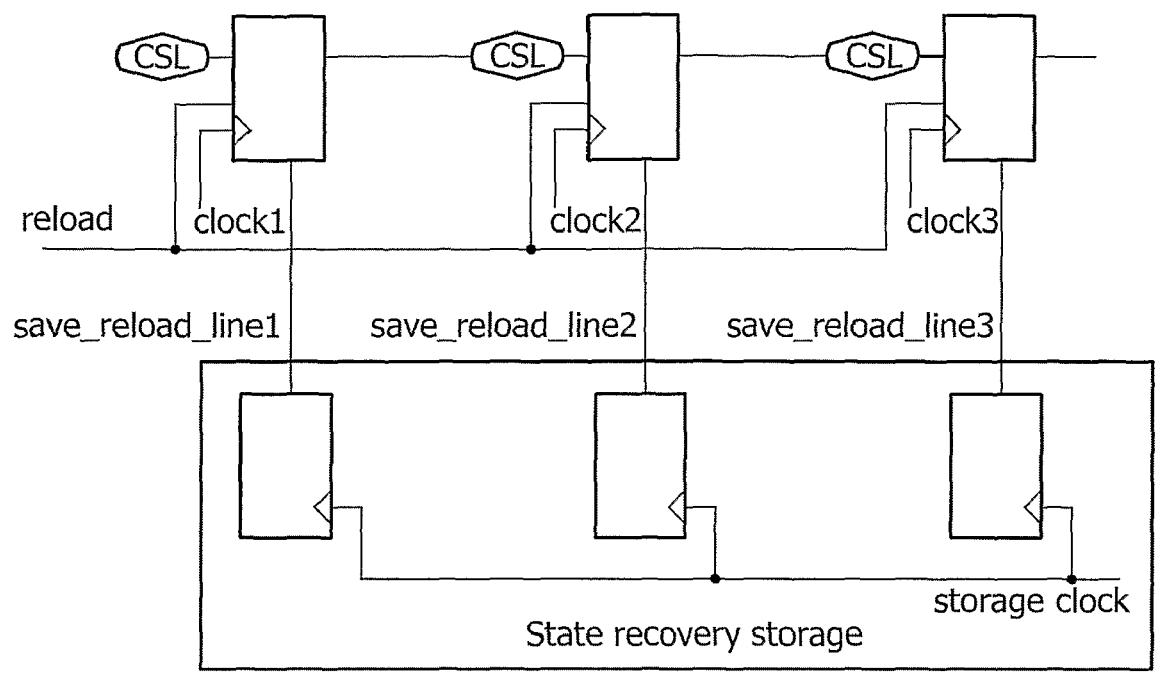
FIG. 5 is a block diagram showing an improved architecture for parallel store and reload according to an alternative to the second embodiment.

FIG. 5 shows an improved embodiment of the one illustrated in FIG. 4. This improved embodiment is an alternative to the architecture described with reference to FIG. 4; in that a dedicated flip-flop type is designed that is able to perform the multiplexing/de-multiplexing of the two store and reload lines in order to reduce by a factor of two the number of wires. This improved architecture also permits to eliminate the additional load on the functional output of each flip-flop.

The overhead of the second embodiment illustrated in FIG. 4 or FIG. 5 compared to the first embodiment illustrated in FIG. 2 and FIG. 3 mainly consists of routing. However the routing in I/O peripherals is usually not as dense as it is in micro controller cores. The overall architecture of the second embodiment described with reference to FIG. 4 and FIG. 5 is equivalent to the one described with reference to FIG. 3.

Figure 6:
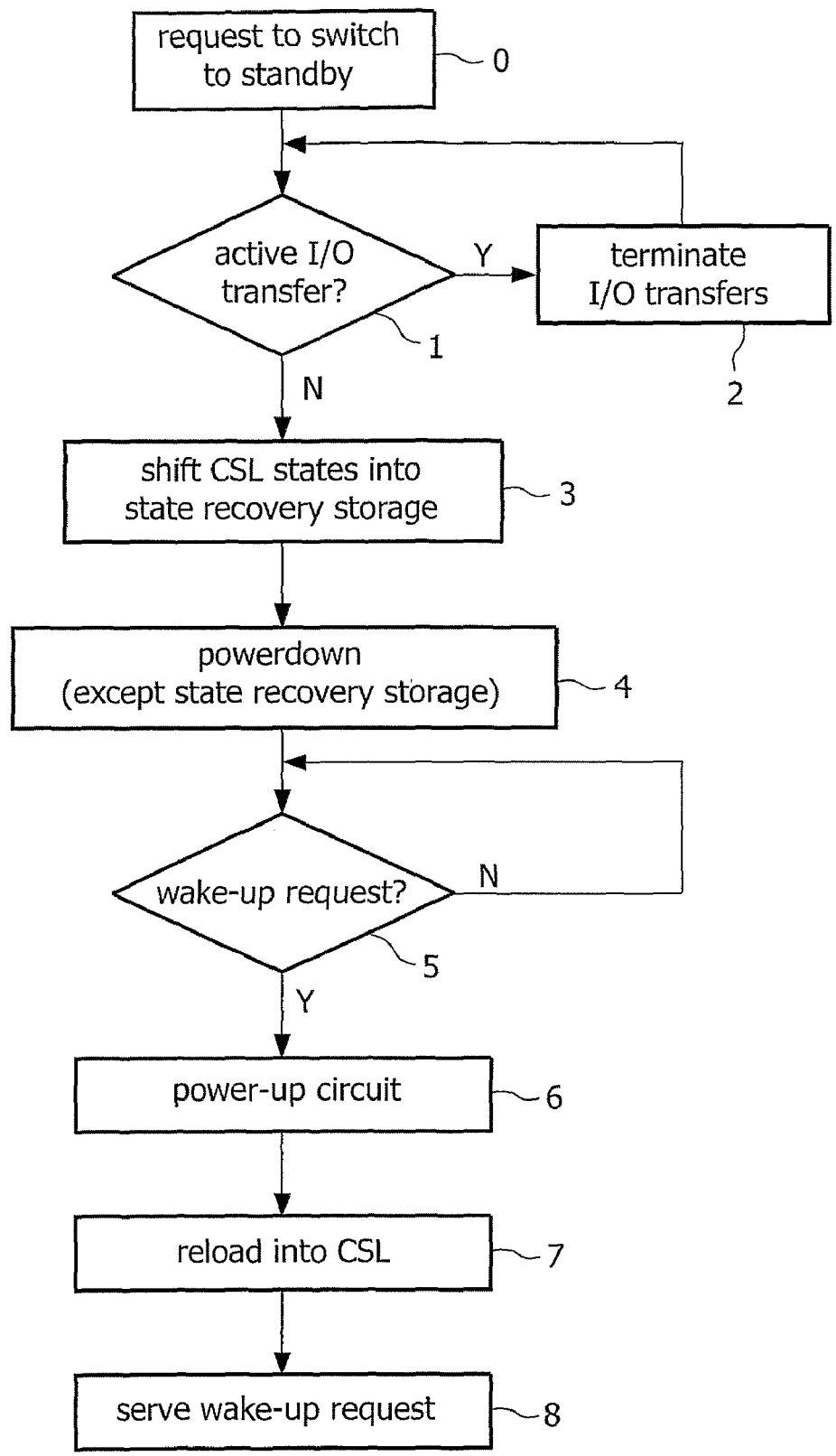
FIG. 6 is a flow chart diagram to illustrate the method used by the power down unit according to either embodiments of the invention.

FIG. 6 illustrates a power down unit flow chart suitable for both first and second embodiments described here before. Some implementation aspects of the Powerdown Unit referred to in FIG. 3 are described in more details here with reference to FIG. 6. The Powerdown Unit is basically equivalent for the two architectures and has the following features: remaining powered during standby mode, using many flip-flops, without accounting much in area by using specially designed flip-flops, and without accounting for any relevant leakage as transistors are designed for low performance.

The method used by such a Powerdown Unit is described hereafter in the flow chart in FIG. 6 comprising the following steps:

a starting step whereby a processor from the multi-processor architecture receives a request to switch from active to standby mode, step 1 to check whether there is an active I/O transfer. In case of no ongoing I/O transfer is assumed, the state of functional sequential logic can be disregarded, step 2 to terminate all I/O transfers in the case the answer to step 1 is yes (Y)

step 3 to shift configuration sequential logic states into state recovery storage, which shift can be performed either serially according to the first embodiment (FIG. 3) or in parallel according to the second embodiment of the invention (FIG. 4 and FIG. 5), step 4 to power down the complete microprocessor architecture except the state recovery storage area, step 5 to check whether a wake-up request is received, step 6 to power-up the circuit again after a wake-up request has been received at step 5, step 7 to reload state recovery storage into configuration sequential logic, step 8 to finally serve the wake-up request.

The invention claimed is:

1. A mobile apparatus comprising:
an integrated circuit block configured to perform predefined functions, the circuit block being susceptible to be set in a standby operating mode wherein which said circuit block can resume operation within a predefined period of time, said circuit block comprising configuration sequential logic and functional sequential logic having defined states; and
a power down unit configured to respond to a request to switch from an active operating mode to the standby operating mode by:
determining whether there is an active Input/Output transfer;
when there is an active Input/Output transfer, terminating the Input/Output transfer, and subsequently storing states of the configuration sequential logic into a state recovery storage area and powering down the circuit block except for the state recovery storage area; and
when there is not an active Input/Output transfer, storing states of the configuration sequential logic into state recovery storage area and powering down the circuit block except for the state recovery storage area.

2. The mobile apparatus as claimed in claim 1, wherein the circuit block comprises different logic blocks to distinguish between the configuration sequential logic and the functional sequential logic, so that only the states of the configuration sequential logic are relevant to be stored into said state recovery storage area.

3. The mobile apparatus as claimed in claim 1 wherein said power down unit comprises a power down control unit configured to control activity levels of the circuit block.

4. The mobile apparatus as claimed in claim 1, further comprising a plurality of wake-up request detectors configured to detect wake-up requests for the circuit block to be powered up again from the standby operating mode into the active operating mode.

5. The mobile apparatus as claimed in claim 1 wherein the states of the configuration sequential logic consist of information data, said data being shifted serially from the configuration sequential logic into the state recovery storage area before the circuit block is powered down in standby mode.

6. The mobile apparatus as claimed in claim 1 wherein the states of the configuration sequential logic consist of information data, the circuit block being arranged so that said data are loaded in parallel from the configuration sequential logic into the state recovery storage area, using storage cell lines to store and reload the data.

7. The mobile apparatus as claimed in claim 5 wherein the circuit comprises dedicated flip-flops configured to perform multiplexing/demultiplexing of store and reload lines.

8. The mobile apparatus as claimed in claim 1 wherein said circuit block is an Input/Output peripheral block configured to enable said mobile apparatus to communicate with peripheral devices.

9. The mobile apparatus of claim 1 wherein the apparatus is configured to respond to a request to switch from the stand-by operating mode to the active operating mode by:
  powering up the circuit block;
  reloading states stored in the state recovery storage area into the configuration sequential logic; and
  resuming the active operating mode of the circuit block.

10. The mobile apparatus of claim 9 wherein the apparatus is configured to respond to the request to switch from the stand-by operating mode to the active operating mode by loading default states of the functional sequential logic before resuming the active operating mode of the circuit block.

11. A method, performed by a mobile device, comprising:
  receiving a request to switch a circuit of the mobile device from an active mode to a standby mode, mode of operation: and
  under control of a power-down unit of the mobile device, determining whether any Input/Output transfers are active;
    when it is determined that Input/Output transfers are active, terminating the Input/Output transfers and subsequently storing states of configuration sequential logic of the circuit into state recovery storage area and powering down the circuit except the state recovery storage area; and
    when it is determined that Input/Output transfers are not active, storing states of configuration sequential logic of the circuit into state recovery storage area and powering down the circuit except the state recovery storage area.

12. The method as claimed in claim 11 wherein the circuit comprises functional sequential logic and the storing is limited to storing states of the configuration sequential logic in the state recovery storage area.

13. The method as claimed in claim 11 wherein the step of storing the states of the configuration sequential logic into the state recovery storage area is performed serially.

14. The method as claimed in claim 11 wherein the step of storing the states of the configuration sequential logic into the state recovery storage area is performed in parallel.

15. The method of claim 11, further comprising:
  responding to a wake-up request by:
    powering up the circuit;
    reloading states stored in the state recovery storage area into the configuration sequential logic; and
    resuming the active operational mode of the circuit.

16. The method of claim 15 wherein the resuming the active operational mode of the circuit comprises resuming operation of functional sequential logic of the circuit in a default state of the functional sequential logic.

* * * * *